United States Patent [19]
Racanelli

[11] Patent Number: 4,511,793
[45] Date of Patent: Apr. 16, 1985

[54] MAIL METERING PROCESS AND MACHINE

[76] Inventor: Sylvester Racanelli, 602 SE. 47th, Portland, Oreg. 97215

[21] Appl. No.: 481,747

[22] Filed: Apr. 4, 1983

[51] Int. Cl.³ ............................................ G06F 15/20
[52] U.S. Cl. .................................. 235/375; 235/462; 364/466
[58] Field of Search ................ 235/375, 462; 364/406, 364/466

[56] References Cited
U.S. PATENT DOCUMENTS 4,117,975 10/1978 Gunn ............................... 235/375 X
4,241,405 12/1980 Allocca ............................... 364/466
4,320,461 3/1982 Dlugos ............................... 364/466
4,410,961 10/1983 Dlugos et al. .................. 364/466 X
4,442,347 4/1984 Hams ............................... 235/375 X Primary Examiner—David L. Trafton
Attorney, Agent, or Firm—Robert L. Harrington

[57] ABSTRACT

A mail metering machine having the ability to allocate postage costs among designated accounts. A bar code is assigned to each designated account and is applied to that accounts mailing envelopes. A bar code scanner is incorporated into the mail metering machine and identifies the account as the mail is fed through the machine. The amounts are totaled for each account and charged back to the account.

6 Claims, 3 Drawing Figures

MAIL METERING PROCESS AND MACHINE

FIELD OF INVENTION

This invention relates to a machine that receives unstamped mail, applies the required postage for mailing, and allocates the postage costs among designated accounts.

HISTORY OF INVENTION

A major objective of cost control management for multi-department businesses is the identification of the costs in running the business and the allocation of those costs among the departments. A common cost for all such businesses is mailing cost.

Mailing costs are easily overlooked in the day to day operation and they are easily abused. It is considered important for large businesses to be able to identify where this abuse is taking place and to correct it. Just making a department responsible for its share of the postage costs will often achieve the desired result.

Companies large and small generally utilize a central mailing system. The mail is collected in a central mailing room, weighed to determine the postage required, stamped, and then shipped off to the local post office. The amount of postage that is applied to each piece of mail is charged to the appropriate department.

A small business may have a substantially manual mailing operation. Such a manual operation involves placing each piece of mail on a scale to determine the postage required, setting the postal metering machine, stamping the piece of mail, and then mailing it. The amount of the postage is entered into a record book of sorts and on a periodic basis the entries are totaled and passed on to the accounting department.

In a larger operation, the mail may simply be placed on a metering machine hopper where it is fed into the machine and automatically stamped with the appropriate postage. However, the allocation process remains the same, and many manual hours are required to make sure that the departments are being properly charged for their postage.

SUMMARY OF THE INVENTION

The present invention is believed to substantially improve the mail room operation by providing a process and machine that accomplishes automatic allocation of postage costs. The preferred embodiment of the invention is a postal metering machine that includes a readout station. Each department is assigned an account no., e.g., a bar code that specifically identifies that department. This code is printed on the department's mailing envelopes or is applied with a label that has the code imprinted thereon. As the item being mailed is fed past the readout station of the metering machine, the department is identified and the postage is automatically charged to that department. The manual operation is all but eliminated.

DETAILED DESCRIPTION

The invention will be more clearly understood by reference to the following detailed description having reference to the accompanying drawing wherein.

A major departure from previous mail metering operations is the provision of pre-coded mailing envelopes. These coded envelopes are provided, for example, by having the envelopes printed with the code in the same manner as letterheads etc., or by printing the code on stick on labels that are applied to the mailing envelopes. Either way each department is provided with its own code which identifies that department. These coded envelopes are then used exclusively for that departments mailings.

Figure 1:
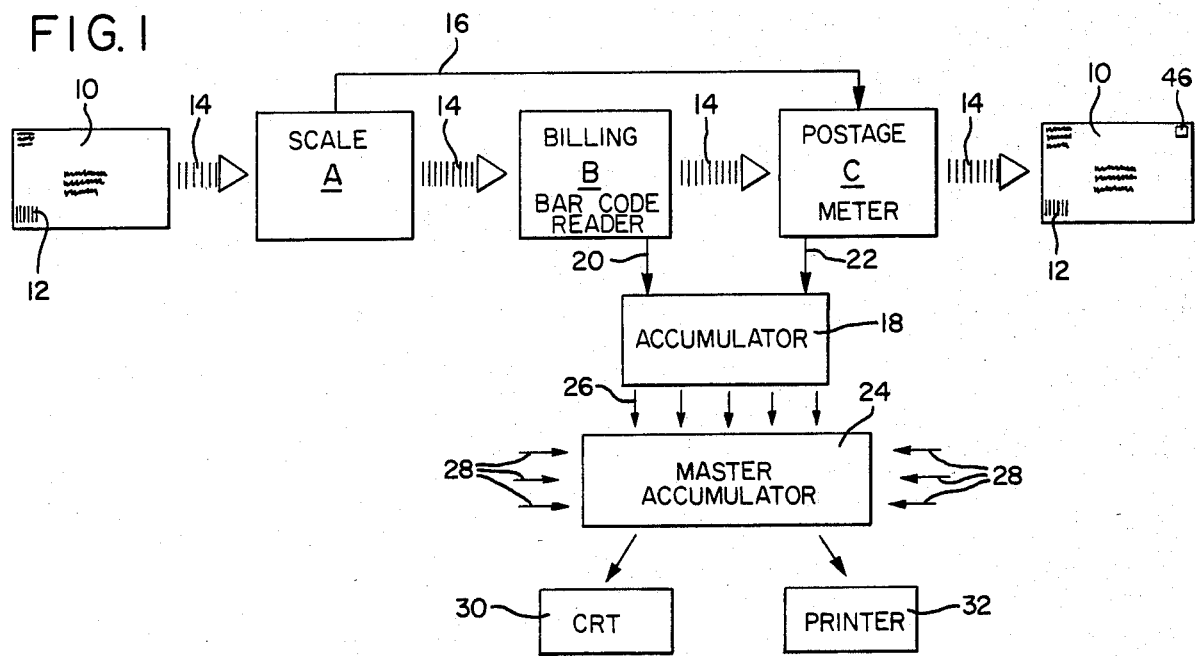
FIG. 1 is a flow diagram illustrating the invention as incorporated into a mail processing operation.

Referring now to FIG. 1, an envelope 10 contains material to be mailed and is provided with a bar code 12. Basically, the mail room operation involves a series of operations and arrows 14 indicate the movement of the envelope through these operations. The function of the first operation A is the determination of how much postage is required for each item being mailed. Postage is determined by weight and thus operation A involves the weighing of the envelope 10, determining the postage required for that weight, and then conveying that information to the metering machine at operation C as illustrated by arrow 16. This information is used to set the machine to dispense the appropriate postage. The envelope 10 is then passed on to operation B.

The function of operation B is to identify the department from which envelope 10 emanated and to record that information. It is an objective of this operation to achieve such recording without manual involvement. Thus as illustrated in FIG. 1, the envelope 10 is directed past the bar code reader B which then conveys the identity of the department to an accumulator 18 as indicated by arrow 20 (as the term is used herein, "accumulator" refers to any machine having the ability to accumulate numbers under specific accounts, e.g. a minicomputer). The accumulator 18 is designed to hold the information indicating department until it receives information as to the amount to be charged that department. The envelope 10 is then passed on to operation C.

Operation C has the function of stamping the envelope 10 with the appropriate postage. This is accomplished by a postage meter which contains a recorded amount of prepaid postage. The meter is set for the amount of postage required for the envelope 10 and a stamping mechanism is activated. The stamping thus applied is accepted by the post office as postage. The amount that is stamped on the envelope is deducted from the prepaid postage recorded in the meter and that amount is also conveyed to the accumulator 18 as indicated by arrow 22.

The envelope 10 is passed through operation C and sent on its way to the post office. The information of arrow 22 is mated with the information of arrow 20 and the accumulator seeks out the prior total of charges made to that department and adds the new amount to that total.

On a periodic basis and as desired by the user, e.g., on a daily, weekly or monthly basis, the postage costs accumulated for each department are conveyed to a master accumulator 24 (as indicated by arrows 26), which accumulates all the costs of each department (as indicated by arrows 28). The accumulation of costs can be disseminated by the master accumulator in any format desired and through various media. For example, it can be displayed on a CRT display 30 and it can be printed out by a hard copy printer 32 for distribution.

Figure 2:
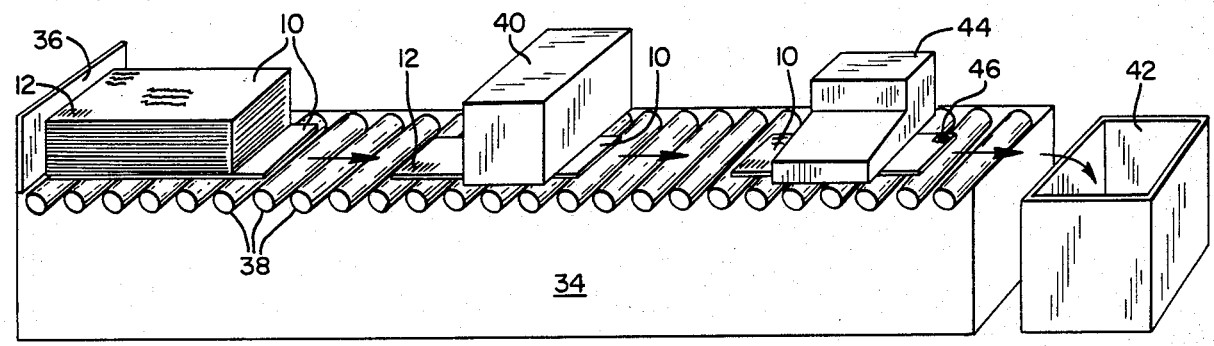
FIG. 2 illustrates a mail metering machine incorporating a bar code readout station in accordance with this invention.

Referring now to FIG. 2, a preferred mail handling and metering machine 34 for most applications of the invention, includes a hopper 36 in which a stack of mail bearing envelopes 10 are placed. An automatic feed mechanism represented by feed rollers 38 feeds the envelopes 10, individually, through the various stations of the machine. As an envelope 10 is fed through a bar code readout machine 40, the bar code 12 located on the lower left corner of the envelope 10 indicates the department to be charged and that information is stored in a mini-computer or other form of accumulator (not shown). The envelope 10 is then fed into a postage meter 44 which has been preset with the desired postage. This preference of operations for the machine presumes that the greatest usage of the machine is for stamping large volumes of mail having similar weights. Thus manual weighing and setting of the meter will be sufficient, which avoids the complexity of an automatic weighing and meter setting operation, a feature to be described further hereafter. The envelope 10 is stamped with a postage stamp 46 and then ejected from the machine 34 into a recepticle 42.

Figure 3:
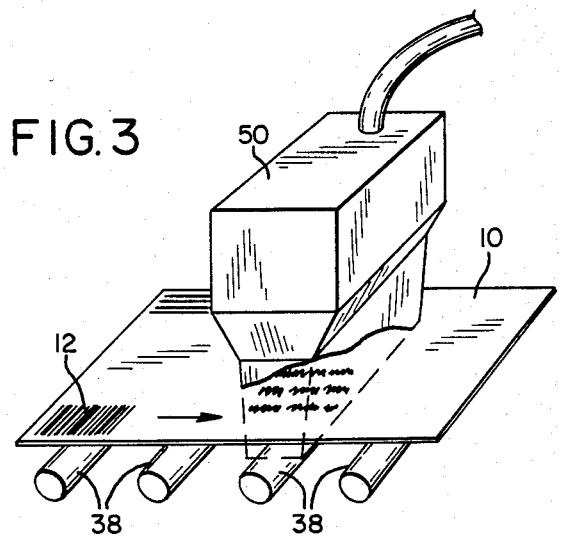
FIG. 3 illustrates a bar code scanner forming a part of the bar code read-out station of FIG. 2.

Referring now to FIG. 3, contained within the bar code readout machine 40 is a bar code scanner 50. As illustrated, this scanner is positioned above the envelope being fed through the machine by feed rollers 38. Bar code 12 is scanned by the scanner and the signal from the scanner is decoded by a bar code reader (which may or may not be housed within the machine 40) to identify a specific account number.

The present invention encompasses a unique combination of steps and components which are explained above, all of which are individually available in other combinations and applied to other applications. For example, a machine having the capability of receiving a stack of mail bearing envelopes and feeding the envelopes individually into a postage meter is presently available from the Pitney-Bowes Company Inc. (and other meter distribution companys as well). A bar code scanner and reader that reads a printed bar code and decodes that code to identify a designated number is available from Interface Mechanisms Inc., and specifically, their Non-Contact Scanner Model 1301 and Bar Code Readers Models 9210, 9230 and 9300.

Mini-computers and the like capable of collecting data, coordinating that data, i.e., matching dollar (or cents) amounts with account numbers, and accumulating totals under specific account numbers, are available in many forms from many companies too numerous to mention. Technicians familiar with accounting systems will readily determine the equipment most beneficial for the application being contemplated. This statement is also quite true for the dissemination of the information through CRT displays and hard copy printers and no attempt will be made herein to identify the specific hardware to accomplish these tasks or the software necessary to interface the various pieces of equipment.

Variations and Modifications

This invention relates to the identification of a particular problem, i.e., the need to allocate postage costs, and the solution to that problem, i.e., the incorporation of a bar code scanning system in a postage meter machine to automatically allocate those costs. This concept may be incorporated in a variety of mailing room systems. For example, in a large company with many departments, or a company that has a wide mixture of mailings and thus different weights requiring different postage, it may be desirable to incorporate an automatic mailing scale. Thus it is quite easy to expand the machine of FIG. 2 to incorporate a scale that would weigh each envelope 10, and a postage meter responsive to the indicated weight that would automatically set the postage to be metered.

The bar code could include other information, e.g., indicating that it is presorted and thus qualified for reduced rates. These and other modifications will be apparent to the technician on evaluating the particular needs of the application in question.

On the other hand, the operation may be simplified. Rather than an automatic feed machanism, as described for the machine of FIG. 2, the individual envelopes may be hand fed past the bar code reading station and into the postage meter 44. Also, the bar code scanner may be of the hand held variety that would be more readily adapted to odd sized envelopes including packages. Other features of the machine could also be made adjustable to accommodate variations in envelope size etc. These and other variations, improvements and modifications will become apparent to those skilled in the art upon exposure to the invention and are within the inventive concept as determined by the claims appended hereto.

I claim:

1. A postage metering and allocation machine comprising; a mail receiving station, a code reading station, a postage metering station, and transporting means for transporting mail individually from the mail receiving station to the code reading station and the metering station, said code reading station adapted to read a designated accounting number code imprinted on the mail, an accumulator, and transmitting means for transmitting to the accumulator the designated accounting number and the postage to be allocated to that number.

2. A postage metering and allocation machine as defined in claim 1 wherein postage setting and transmitting means is provided at the postage metering station for setting the meter to the desired postage amount and for transmitting that amount to the accumulator.

3. A postage metering and allocation machine as defined in claim 2 wherein the accumulator is adapted to accumulate over a period of time the total of postage costs allocated to the designated accounts, and including information disseminating means for disseminating the information on allocated postage costs.

4. A postage metering and allocation machine as defined in claim 3 wherein the code imprinted on the mail is a bar code and a bar code scanner is provided at the code reading station for reading the bar code.

5. A process of allocating postage costs applied to mail bearing envelopes among designated accounts which includes, printing a code on the mailing envelopes to indicate the account to which postage costs are to be charged, determining the weight of each mail bearing envelope to determine the postage required, setting a postage meter to dispense the determined postage amount, feeding the envelope past a bar code reader to identify the designated account and transmitting the account number to an accumulator, feeding the envelope past the postage meter for stamping the envelope with the determined postage amount, and conveying that amount to the accumulator to be mated with the account number.

6. A process of allocating postage costs among designated accounts as defined in claim 4 including accumulating postage charges for a period of time and on command disseminating the accumulated costs.

* * * * *